US010560802B1

(12) United States Patent
Sagade et al.

(10) Patent No.: US 10,560,802 B1
(45) Date of Patent: Feb. 11, 2020

(54) SYSTEMS AND METHODS FOR USE IN GEOLOCATION TRACKING

(71) Applicant: MASTERCARD INTERNATIONAL INCORPORATED, Purchase, NY (US)

(72) Inventors: Chinmay Sharad Sagade, Chesterfield, MO (US); Ganesh Nagendra Prasad, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/250,554

(22) Filed: Jan. 17, 2019

(51) Int. Cl.
*H04W 4/021* (2018.01)
*H04W 4/02* (2018.01)
*G06Q 20/38* (2012.01)
*G06F 16/29* (2019.01)
*H04W 4/24* (2018.01)
*G06Q 30/02* (2012.01)

(52) U.S. Cl.
CPC .......... *H04W 4/021* (2013.01); *G06F 16/29* (2019.01); *G06Q 20/389* (2013.01); *H04W 4/023* (2013.01); *H04W 4/24* (2013.01); *G06Q 30/0205* (2013.01)

(58) Field of Classification Search
CPC ....... H04W 4/02; H04W 4/029; H04W 4/021; H04W 4/025; G06F 16/29; H04L 67/18; G06Q 20/389; G06Q 30/0205
See application file for complete search history.

(56) References Cited

U.S. PATENT DOCUMENTS 9,307,360 B1* 4/2016 Zhyshko ............... H04W 16/24
2014/0180767 A1* 6/2014 Villars ............... G06Q 30/0205
705/7.34

* cited by examiner

*Primary Examiner* — Nam T Huynh
(74) *Attorney, Agent, or Firm* — Harness, Dickey & Pierce, P.L.C.

(57) ABSTRACT

Disclosed are exemplary embodiments of systems and methods for use in geolocation analysis. In one exemplary method, a computing device accesses boundary definitions associated with regions. For each region, the computing device determines a centroid of the region, having a location including a latitude and a longitude, based on an associated boundary definition, truncates the centroid location by deleting the latitude or longitude, and stores the truncated location as a partition key for the region. The computing device also accesses a transaction record, including a merchant point location having a latitude and longitude. The computing device truncates the point location by deleting the latitude or longitude, and identifies regions associated with the partition keys based on a comparison of the truncated point location to the partition keys. The computing device then determines whether the point location is included in one of the identified regions.

17 Claims, 4 Drawing Sheets

SYSTEMS AND METHODS FOR USE IN GEOLOCATION TRACKING

FIELD

The present disclosure generally relates to systems and methods for use in geolocation tracking analysis, and in particular, to systems and methods for use in reducing region search sets in connection with determining discrete location memberships within regions.

BACKGROUND

This section provides background information related to the present disclosure which is not necessarily prior art.

Location data is known to be generated and/or provided in various forms. Occasionally, depending on a particular implementation, location data may need to be converted to another format or augmented with further data related to a location or region indicated by the location data.

In addition, accounts are known to be used to initiate and fund purchase transactions with merchants. In conventional transactions, as part of authorization, clearing and settlement of the transactions, transaction data is collected and stored. The transaction data may include information specific to a transaction (e.g., amount, etc.), information specific to a consumer associated with a transaction (e.g., payment account number, name, etc.), and information specific to a merchant associated with a transaction (e.g., merchant identifier, merchant location, etc.). The transaction data is employed to complete the purchase transactions, from authorization or settlement. The transaction data is further used, with proper permissions and consent, in services provided by payment networks and/or issuers involved in the purchase transactions. Example services include fraud prevention services, marketing services, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Data is stored in connection with account transactions (in the form of transaction records, etc.). Often, the data includes transaction data (in a transaction record), and the transaction data may be incomplete, and filled in based on the other transaction data (or other data). For example, when a region of a merchant (e.g., a specific city, a state, a postal code, etc.) is absent from a transaction record, it may be filled into the record based on a latitude and a longitude of the merchant. To do so, multiple regions are searched based on boundaries of the regions, until a region is identified as including the merchant, e.g., as a membership search. For this type of analysis, the processing of the record, to find the region, is generally limited to one computing device, thereby limiting the use of parallel processing for the analysis.

Uniquely, the systems and methods herein permit such region identification to be reduced to (or based on) a limited, reduced number of the multiple starting regions, thereby reducing search resources to place the merchant in one of the starting regions. In particular, a location engine determines, for each of the available starting regions, a centroid of the region in latitude and longitude (i.e., as a two-dimensional location). The location engine then truncates the two-dimensional location to a one-dimensional location, for example, by deleting the latitude or the longitude. In turn, the truncated location is assigned to the region as a partition key. Then, when a location of the merchant needs to be assigned to a region, the location of the merchant is truncated (in a corresponding manner) and identified to one or more of the regions through the partition keys that either match a corresponding dimension of the location or are within a defined threshold or range or number of partition keys from a match or a next closest partition key. In connection therewith, the location engine determines only whether the location of the merchant is contained in the identified regions. In this manner, the final search for the particular region which includes the location is more efficient, as it is limited to a selected number of regions (not all available regions). What's more, the exclusion of regions (i.e., not identified regions) may permit parallel processing among multiple computing devices for determining a region of membership from the identified region (e.g., where different computing devices perform determinations for select regions, etc.). When the particular region is ultimately determined, the location engine is then able to assign the region to the transaction record that included, for example, the location for the city, state or postal code, etc. corresponding to the region.

Figure 1:
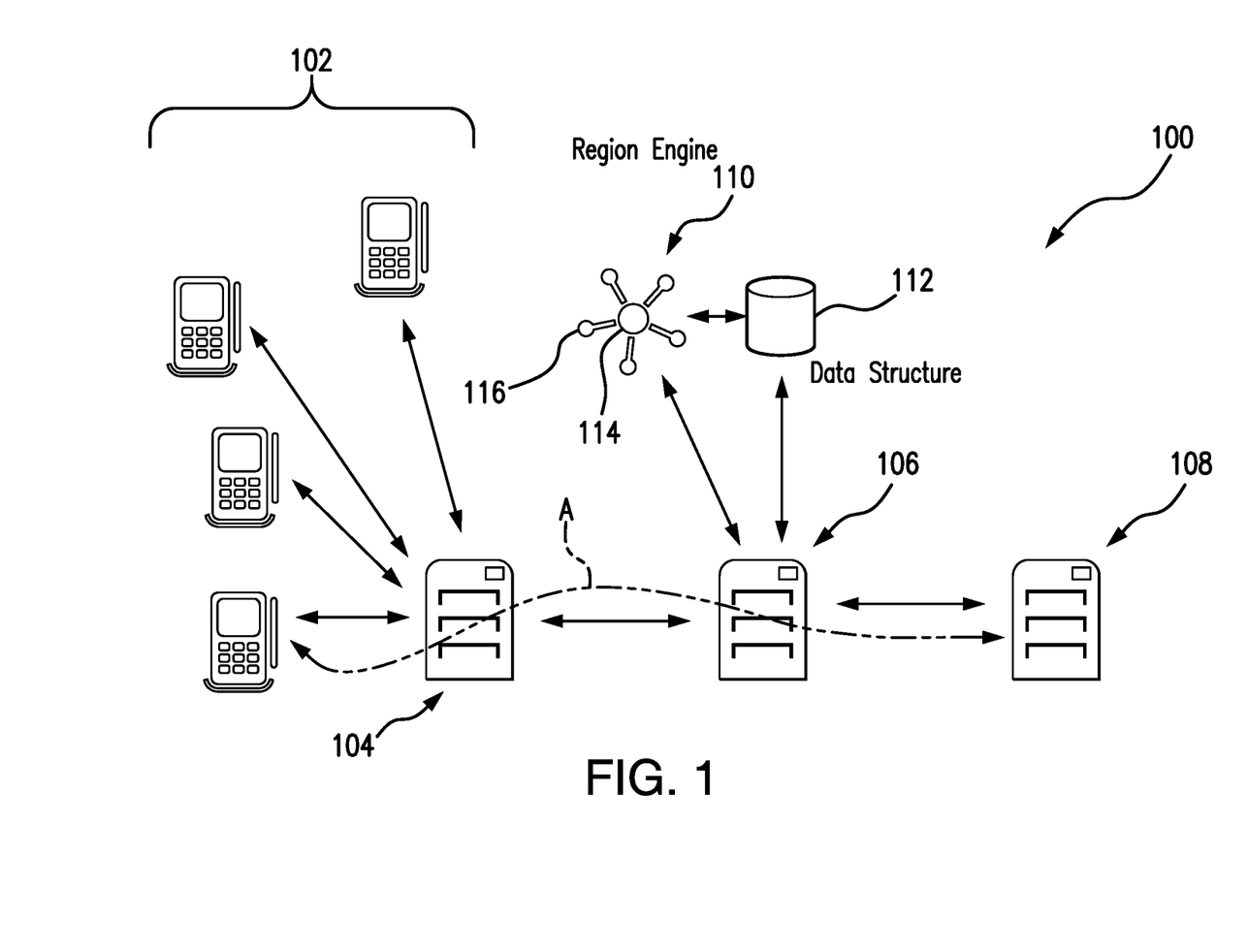
FIG. 1 illustrates an exemplary system of the present disclosure suitable for use in tracking and/or identifying regions in which location data for one or more first parties is included.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on types and/or numbers of regions, numbers and relations of entities included in the system 100, etc.

As shown in FIG. 1, the system 100 generally includes multiple merchants 102 (broadly, first parties), an acquirer 104 associated with the each of the merchants 102, a payment network 106, and an issuer 108, each coupled to one or more networks to allow communication there between (and with other entities, devices, etc.). The network interactions, through such networks, are indicated by the arrowed lines in FIG. 1 and each may include, without limitation, a wired and/or wireless network, a local area network (LAN), a wide area network (WAN) (e.g., the Internet, etc.), a mobile network, and/or another suitable public and/or private network capable of supporting communication as illustrated. In one example, one or more of the networks may include a private network made accessible by the payment network 106 to the acquirer 104 and the issuer 108 and, separately, a public network (such as the Internet) through which the merchants 102 connect to the acquirer 104.

In the system 100, the merchants 102 offer to sell, and do sell, products (e.g., goods, services, etc.) to consumers. The products may be offered for sale, and sold, at a physical location associated with the respective merchant, or potentially, the products may be offered for sale and/or sold at virtual locations of the merchants, where the merchants are still associated with physical locations. In the system 100, the merchants 102 are dispersed and disposed in one or more different geographical regions. The regions may include, for example, different cities, states, provinces, territories, postal codes, or any other geographical boundaries defined by nature, or by laws, rules, regulations, etc. Although not expressly shown in FIG. 1, each of the regions should be understood to have a generally polygon shape (e.g., a rectangular shape or otherwise, etc.), which includes a centroid as describe more below.

When a consumer (not shown) arrives at one of the merchants 102, for example, at the physical location of the merchant or, potentially, at a virtual location thereof, the consumer may decide to purchase a product. In connection therewith, the consumer presents a payment device (e.g., a credit card, virtual wallet, fob, etc.) to the merchant 102. In turn, the merchant 102 is configured to capture, read, or otherwise receive/retrieve a payment account credential from the payment device (e.g., via a point-of-sale (POS) terminal, etc.). The merchant 102 is also configured to generate an authorization request for the purchase transaction and to transmit the authorization request to the acquirer 104, as indicated by path A in FIG. 1. The authorization request generally includes information about the merchant 102 and the transaction. For example, the authorization request may generally include, for example, a terminal ID for the POS terminal, a merchant ID for the merchant 102, a merchant location (e.g., a street number, a street name, a city, a state, a postal code, a latitude and longitude, etc.), a merchant category code (MCC), an acquirer ID, an amount of the transaction, a payment account number, an expiration date for the payment device, a card verification code (CVC), a PIN, etc.

Upon receipt, the acquirer 104 is configured to communicate the authorization request with the issuer 108 (as the issuer of the consumer's payment account) along path A through the payment network 106, such as, for example, through Mastercard®, VISA®, Discover®, American Express®, etc. The issuer 108 is configured to then determine whether the consumer's payment account is in good standing and whether there are sufficient funds and/or credit to fund the transaction. If approved, an authorization reply, or response (indicating the approval of the transaction), is transmitted back from the issuer 108 to the merchant 102, thereby permitting the merchant 102 to complete the transaction. The transaction is later cleared and/or settled (via appropriate transaction messages such as clearing messages and/or settlement messages, for example) by and between the merchant 102, the acquirer 104, and the issuer 108 (by appropriate agreements). If the transaction is declined, however, an authorization reply (indicating the decline of the transaction) is provided back to the merchant 102 (specifically, back to a POS terminal (not shown) of the merchant), thereby permitting the merchant 102 to halt or terminate the transaction, or request alternate funding.

While path A is illustrated in FIG. 1 as being specific to one of the merchants 102, authorization requests may be transmitted (for other purchase transactions) by any of the other merchants 102 illustrated in the system 100 to the acquirer 104 in a similar manner. In addition, while the acquirer 104, the payment network 106, and the issuer 108 are illustrated apart from the merchants 102 occupying the different respective regions, it should be appreciated that these entities are not limited to any particular location and, in fact, may be located inside the regions or outside of the regions of the merchants, or inside another region (not shown). In general, it is the locations of the merchant 102 in the one or more different regions, which is germane to the present disclosure.

Transaction data is generated, collected, and stored as part of the above interactions among the merchants 102, the acquirer 104, the payment network 106, and the issuer 108. The transaction data represents transactions, and in particular transaction records (broadly, all data records), where each transaction is associated with one of the transaction records. The transaction data is further segregated into authorization, clearing, and settlement data, with different transaction data being generated for each. The transaction data, in this exemplary embodiment, is stored at least by the payment network 106 (e.g., in a data structure 112 associated with the payment network 106, etc.). Additionally, or alternatively, transaction data may be transmitted among parts of the system 100 as desired and/or necessary. As used herein, transaction data may include, for example (and without limitation), primary account numbers (PANs), transaction amounts, merchant IDs, merchant addresses (e.g., street addresses or parts thereof), latitudes and longitudes of the merchants, merchant category codes (MCCs), date/times of the transactions, acquirer IDs, acquirer names, etc. It should be appreciated that more or less information related to transactions, as part of either authorization or clearing and/or settling, may be included in transaction records and stored within the system 100, for example, at the payment network 106 in the data structure 112 associated therewith, etc.

While five merchants 102 (in one or more different regions), one acquirer 104, one payment network 106, and one issuer 108 are illustrated in FIG. 1, it should be appreciated that a different number of these entities, and other entities, in the same of different regions, may be included in other system embodiments. In addition, the other merchants may be located in different regions, or in the same regions as one or more of the illustrated merchants 102, which may be subject to the disclosure herein.

Figure 2:
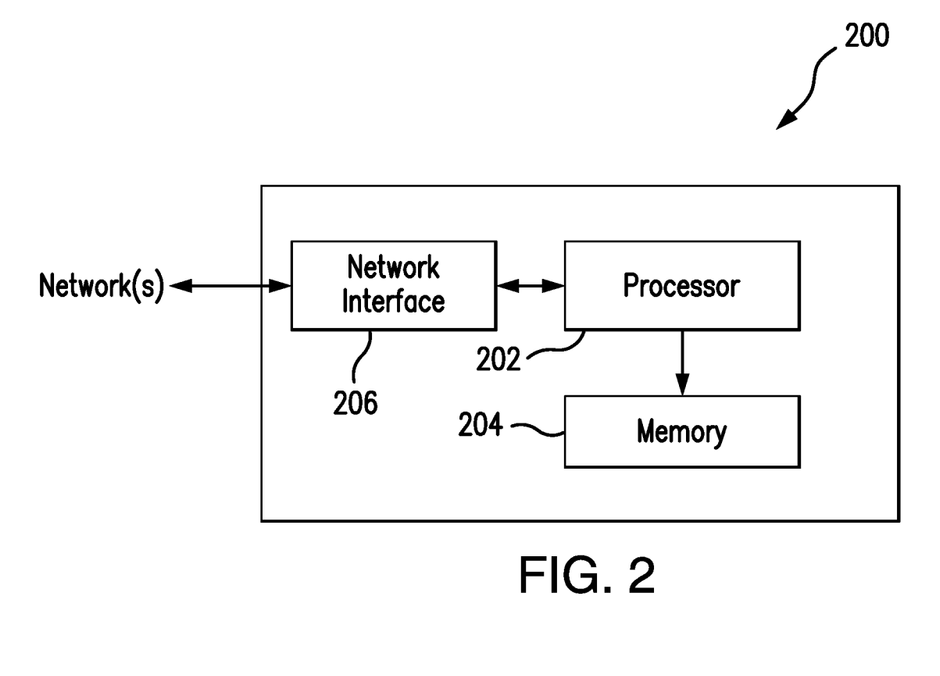
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, point-of-sale (POS) terminals, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In the exemplary embodiment of FIG. 1, each of the merchants 102, the acquirer 104, the payment network 106, and the issuer 108 are implemented in a computing device generally consistent with the computing device 200, coupled to (and in communication with) one or more of the networks in FIG. 1 (again, as illustrated by the arrowed lines).

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, location data, region definitions, partition keys, and/or data (or data structures), and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition, the illustrated computing device 200 further includes a network interface 206 coupled to (and in communication with) the processor 202 and the memory 204. The network interface 206 may include, without limitation, a wired network adapter, a wireless network adapter, a mobile network adapter, or other device capable of communicating to/with one or more different networks, including the networks of the system 100. Further, in some exemplary embodiments, the computing device 200 includes the processor 202 and one or more network interfaces (including the network interface 206) incorporated into or with the processor 202.

Referring again to FIG. 1, the system 100 includes a region engine 110, which is configured by executable instruction to perform as described herein. The region engine 110 includes one or more computing devices, which are generally consistent with the computing device 200. When the engine 110 includes multiple computing devices, as shown by the multiple nodes in FIG. 1, there is a primary node computing device 114 and multiple node computing devices 116 (i.e., with each of the node computing devices 116 illustrated as being disposed around the primary node computing device 114). The primary node computing device 114 is configured, by executable instruction, for example, to perform certain operations, while the other node computing devices 116 are configured by executable instruction, for example, to perform certain other operations, as described below. In general, however, the node computing devices 116 each include multiple boundary definitions for regions stored in memory (e.g., in the memory 204, etc.), where, for example, each of the node computing devices 116 includes at least some different boundary definitions. In various embodiments, a boundary definition for a region is included in only one of the node computing devices 116, or alternatively, in other embodiments, the boundary definition for the region may be included in multiple different ones of the node computing devices 116.

The region engine 110 is coupled to (and/or is in communication with) the data structure 112, which includes transaction data from multiple payment account transactions as described above. The data structure 112 is illustrated in FIG. 1 as a standalone device and, in this exemplary embodiment, is generally consistent with the computing device 200. In other embodiments, the data structure 112 may be incorporated with the region engine 110 (e.g., in the computing device 200 associated therewith, etc.). Further, in other embodiments, the region engine 110 and/or the data structure 112 may be included in the payment network 106, for example, in one or more computing devices therein, or potentially in either of or both of the acquirer 104 and the issuer 108. It should be further understood that the data structure 112 may include multiple different data structures, located together or remote from one another. In general, for example, transaction data may be stored in one data structure, while centroid data is stored in a different data structure (with both included in the data structure 112 in this embodiment, or not in other embodiments).

Figure 3:
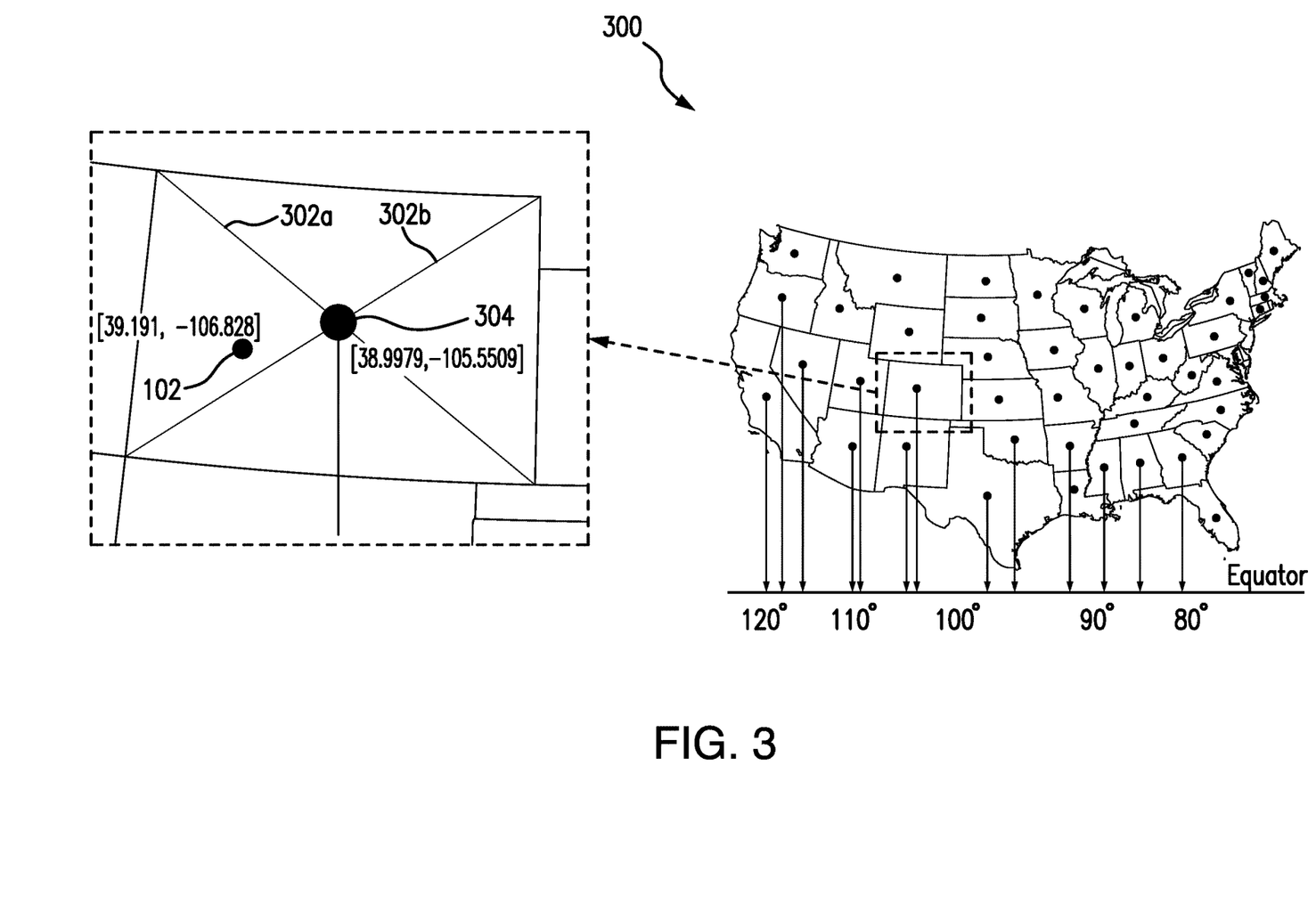
FIG. 3 is an exemplary diagram of different regions that may be used in connection with the system of FIG. 1, where each of the different regions is illustrated as having a centroid.

In this exemplary embodiment, the data structure 112 includes multiple boundary definitions, each of which is associated with a region. FIG. 3, for example, illustrates multiple regions 300 that may be represented by such boundary definitions, and which (in this example) include the forty-eight continental states of the United States. For each of the states (broadly, regions), the data structure 112 includes a boundary definition, which provides the precise location of the boundary of the given state. Colorado, for example, as enlarged in FIG. 3, includes a boundary definition based on various spatial points (as defined, in part, in Table 1, below). The boundary definition generally defines a polygon, which, for Colorado, is generally a rectangular polygon. Each of the remaining states in FIG. 3 includes a corresponding boundary definition in the data structure 112. It should be appreciated that the boundary definitions may define any different sizes, shapes, or types of regions, or subset of regions. For example, in other embodiments, the United States may be one region, or each county within each state may be a region, etc. Often, the geographic area considered may implicate regions to be used and/or considered (e.g., countries, territories, states, counties, postal code regions, cities, etc.).

When transaction data is generated and/or stored in this embodiment, as described above, the transaction data is stored by the payment network 106 in the data structure 112. Each of the transactions associated with the transaction data (e.g., specific to authorization, clearing, settlement, or a combination thereof, etc.), or groups of transactions, are represented by a transaction record in the data structure 112. In connection therewith, the transaction records may be incomplete, as to the location of one of the merchants 102 involved in the transaction. For example, a region, such as a city, state, territory, etc., may be omitted from the transaction record.

When a region is omitted from a transaction record (for a merchant, a consumer, an acquirer, another entity, etc.), but when a latitude and a longitude are included (as a point location), the region engine 110 is configured to assign a region, from among one or more of the potential regions 300 in FIG. 3, for example, as a recognized region of the merchant/first party and/or the transaction record. In particular, the region engine 110 is configured to initially determine a centroid for each of the potential regions 300 (and store the determined centroids in the data structure 112). The region engine 110 may be configured to determine the centroid of the potential regions once, and then store the centroid (or representation thereof) in the data structure 112, or may determine the centroid multiple times (e.g., at an interval or in connection with assigning a recognized region to a transaction record).

As shown in FIG. 3, the region engine 110 is configured to determine a centroid of each of the forty-eight continental states in the United States, based on the boundary definition of the state (as indicated by the dots in FIG. 3). For example, for a state defined by an n-dimensional polygon (e.g., with a finite set of boundary points, etc.), the region engine 110 is configured to identify a center of mass of that polygon by connecting lines between each point and a midpoint of the opposite side of the polygon. Lines 302a, 302b are shown in FIG. 3, to define centroid 304 of Colorado (in terms of latitude and longitude as 38.9979 and 105.5509). The centroid may be calculated as provided by the equations below, where $C_x$ is the longitude and $C_y$ is the latitude of the centroid.

$$C_x = \frac{1}{6A} \sum_{i=0}^{n-1} (x_i + x_{i+1})(x_i y_{i+1} - x_{i+1} y_i)$$

$$C_y = \frac{1}{6A} \sum_{i=0}^{n-1} (y_i + y_{i+1})(x_i y_{i+1} - x_{i+1} y_i)$$

It should be appreciated that other manners of identifying the centroid may be used, depending on, for example, a shape of the polygon defining the given region, etc. The centroid of each region, or state in FIG. 3, is then defined by a latitude and a longitude, which is a two-dimensional expression of location. That said, the centroid may be understood to be the point of the n-dimensioned polygon at which a cut-out of the polygon could be balanced.

When the centroid for each region is determined, the region engine 110 is configured to truncate each centroid to a one-dimensional expression of the location. For example, the region engine 110 may be configured to omit one of the latitude and the longitude of the centroid, such that the truncated centroid includes only the latitude or the longitude (i.e., the centroid is represented by a one-dimensional location). The region engine 110 is also configured to round the one-dimensional centroid to the nearest integer (e.g., rounded up, rounded down, etc.). The rounded one-dimensional expression is referred to herein as a partition key for the region. The region engine 110 is configured to store the partition key for each region in the data structure 112, thereby providing a database, such as a table, of the partition keys, in order, either ascending or descending, etc. Each of the partition keys is associated with a state (broadly, a region) in the example of FIG. 3. For instance, the rounded and truncated centroid of Colorado may be determined to be −105 (i.e., the rounded and truncated longitude), which is stored, by the region engine 110, in the data structure 112 as the partition key for Colorado.

Thereafter, when a transaction record is identified that does not include a region for a given aspect of the record (e.g., for an entity involved in the transaction, etc.), but includes a point location (e.g., expressed as latitude and longitude, etc.), the region engine 110 is configured to truncate and round the point location (in a manner consistent with the determination of the centroids of the regions described above). In the example shown in FIG. 3, a transaction record involving the merchant 102 may include a point location for the merchant 102 having a latitude of 39.191 and a longitude of −106.825, which is then truncated and rounded, by the region engine 110, to −106. Next, the region engine 110 is configured to identify one or more regions in which the point location may be located (e.g., one or more of the states in FIG. 3, etc.). Specifically, the region engine 110 is configured to identify one or more regions where the rounded truncated point location is sufficiently consistent with the partition keys of the regions. That is, the partition key may be within a defined threshold of the point location (e.g., 1 degree, 4 degrees, 5 degrees, 10 degrees, or discrete values therebetween, or less or more, etc.), or vice-versa.

Once the region(s) are identified, the region engine 110 is then configured to determine which one of the at least one of the multiple regions includes the point location of the merchant 102 (e.g., Colorado in the example of FIG. 3, etc.).

In connection therewith, in this embodiment, the primary node computing device 114 of the region engine 110 is configured to provide the point location to one of the node computing devices 116, which includes boundary definitions for one or more identified regions. For example, where a first node computing device 116 includes boundary definitions for regions A, B, C, and D, and a second node computing device 116 includes boundary definitions for regions E, F, G and H, the primary node computing device is configured to identify or select the first node computing device 116 when the identified regions includes A, B, C, or D and provide the point location thereto. It should be appreciated that the primary node computing device 114 may identify or select more than one node computing device (e.g., where the identified regions include A, B, F, and G, etc.), prior to providing the point location to each. Upon receipt of the point location, the node computing device(s) 116 of the region engine 110 is/are configured to determine which region (from which it includes boundary definitions) includes the point location.

The region engine 110 may then be configured to assign the determined region as a recognized region of the merchant 102 and/or the transaction and/or to store the recognized region in the transaction record in the data structure 112.

Figure 4:
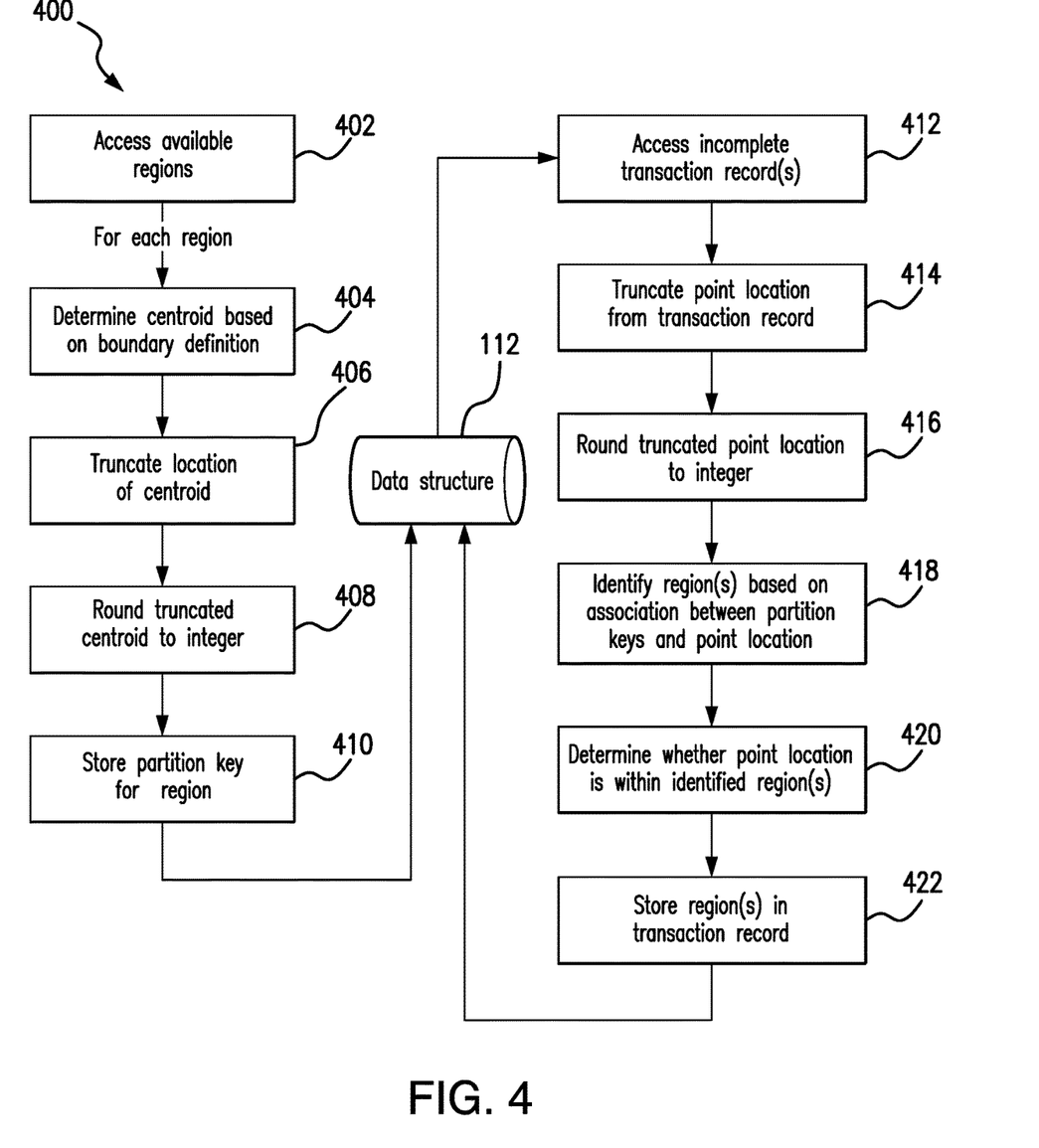
FIG. 4 is an exemplary method for use in tracking and identifying a region in which a particular location is included, and which is suitable to be implemented in the system of FIG. 1.

FIG. 4 illustrates an exemplary method 400 for use in identifying a region in which a location (such as a merchant location, etc.) is included. The method 400 is described with reference to the system 100, and in particular to the region engine 110 and the data structure 112 thereof. Reference is also made to the computing device 200 of FIG. 2 and the regions 300, the point location (39.191, −106.825) of the merchant 102, and the centroid 304 illustrated in FIG. 3. The methods described herein (including the method 400), however, should not be considered to be limited to the system 100, or the computing device 200. Likewise, the systems and devices herein should not be considered to be limited to the method 400.

In the method 400, at the outset, the region engine 110 accesses, at 402, multiple boundary definitions, in the data structure 112, for each of multiple potential regions. The potential regions may include any region within which a point location of a transaction record may be located. For example, in FIG. 3, the accessed regions 300 include the forty-eight continental states of the United States. In connection therewith, Table 1 includes a boundary definition for the state of Colorado (which, broadly, is one of the regions 300 in FIG. 3). Similar boundary definitions are provided in the data structure 112 for each of the other forty-seven states (all of which, broadly, are also one of the regions 300 in FIG. 3), and are accessible to the region engine 110.

TABLE 1

| State | Geometry |
|---|---|
| Colorado | Polygon defined by[[[−106.978683918134365, 41.003383989512294], [−106.974207073696007, 41.003372011023053], [−106.974152983592106, 41.003372011023053], [−106.966608006326283, 41.003344994478645], [−106.962705030252948, 41.003330995521338], [−106.959806077057024, 41.003319998402297], [−106.959357958313078, 41.00331898816826, . . .]] |

At 404, the region engine 110 determines a centroid for each of the accessed regions, based on the boundary definitions. Based on the boundary definition of the state of Colorado (as included in Table 1), the region engine 110, consistent with the above, determines the centroid 304 of Colorado to be at 38.9979 latitude and −105.5509 longitude (or 38° 59'52.44"N, 105° 33'3.24"W), as shown in FIG. 3. The region engine 110 then determines a centroid for each of the other states in FIG. 3, where each of the centroids is represented by a dot and associated with a latitude and a longitude.

Next, at 406, the region engine 110 truncates the centroid (e.g., the location of the centroid, etc.) of each of the regions, at 406. Specifically, in this exemplary embodiment, the region engine 110 omits or deletes the latitude of the centroid of each of the regions, leaving only the longitude. This effectively reduces the two-dimensional centroids of the regions to one-dimensional centroids. As such, in the example of FIG. 3, the centroid of Colorado is truncated to only the longitude, or −105.5509. In effect, by truncating the latitude from the centroid location in this example, the region engine 110 translates the centroid of each state (or broadly, each region) to the equator. With that said, it should be appreciated that other embodiments of the method 400 may omit the truncating of centroids, whereby the remaining parts of the method 400 may be applied to both the latitude and the longitude of the centroid. Further, it should be appreciated that in still other embodiments, in connection with truncating the centroid, the region engine 110 may omit or delete the longitude of the centroid (thereby leaving only the latitude). It should also be appreciated that when the region engine 110 truncates the centroid, the region engine 110 may do so in a manner such that the truncated part (here, the latitude) is preserved in the data structure 112, or otherwise. For example, the region engine 110 may make a copy of the centroid and then truncate the copy for use herein, such that the actual centroid for the given region is not modified and the integrity of the data structure 112 is preserved.

In addition, the region engine 110 rounds, at 408, each of the truncated centroids for the regions to an integer (e.g., rounds up, rounds down, rounds to the nearest desired value (e.g., the nearest integer, etc.), etc.). Referring again to the Colorado example in FIG. 3, the region engine 110 rounds the longitude value of −105.5509 down to the integer −105. It should be appreciated that the centroid may be rounded to the nearest tenth, or hundredth, etc., in other embodiments of the method 400. What's more, it should be appreciated that in at least one other embodiment of the method 400, rounding of the centroid to an integer (or otherwise) may be omitted, whereby the unrounded centroid (or longitude or latitude thereof) may be used in the remainder of method 400, as described below.

Then, the truncated and rounded centroid is stored in the data structure 112, at 410, as the partition key (for each of the accessed regions). For instance, in the example of FIG. 3, the integer −105 is stored in the data structure 112 as the partition key for the state of Colorado. In connection therewith, Table 2 includes a listing of partition keys for states of the continental United States in FIG. 3 (as the accessed regions), including the partition key for Colorado of −105. It should be appreciated that the partition keys may be stored in ascending or descending order, by partition key, to aid in the operations described below, or ordered otherwise, or not at all.

TABLE 2

| Region | Partition Key |
|---|---|
| Utah | −111 |
| Arizona | −111 |
| Montana | −110 |
| Wyoming | −107 |
| New Mexico | −106 |
| Colorado | −105 |
| South Dakota | −99 |
| North Dakota | −99 |
| Nebraska | −98 |
| Oklahoma | −98 |
| Texas | −97 |
| Kansas | −96 |
| . . . | . . . |

With the partition keys for each of the potential (accessed) regions stored, the region engine 110 next accesses, at 412, one or more incomplete transaction records included in the data structure 112. In so doing, in connection with the example of FIG. 3, one of the accessed transaction records includes a point location for the merchant 102 at 39.191 latitude and −106.828 longitude. The point location is within Colorado, but such specific location is not reflected in the transaction record. Instead, the transaction record only includes the point location (and not the state (i.e., Colorado) (broadly, the region) in which the point location is included).

When the point location for a merchant is included in an incomplete transaction record, but a region is not (e.g., a state, city, country, postal code region, user defined region, etc.), the region engine 110 attempts to identify the missing region. Rather than test the point location from the transaction record against each boundary definition for all potential/accessed regions until a region is identified (e.g., against all boundary definitions for the forty-eight states of the continental United States in the example of FIG. 3, etc.), the region engine 110 truncates the point location included in transaction record, at 414. In this exemplary embodiment, the region engine 110 truncates the point location from the transaction record in the same manner that it truncates the centroid for each accessed region (at 406). Accordingly, at 414, the region engine 110 deletes or omits the latitude of the point location, leaving the longitude. As such, in the example of FIG. 3, the point location of the merchant 102 is reduced to the longitude of −106.828. And, again, when the region engine 110 truncates the point location included in the transaction record, the region engine 110 may do so in a manner such that the truncated part (here, the latitude) is preserved in the data structure 112, or otherwise. For example, the region engine 110 may make a copy of the point location included in the transaction record and then truncate the copy for use herein, such that the point location in the transaction record is not modified and the integrity of the transaction is preserved.

The region engine 110 then rounds, at 416, the longitude of the truncated point location to an integer (e.g., rounds up, rounds down, rounds to the nearest, etc.), in a similar manner to that described above for the centroid. In doing so, in the example of FIG. 3, the region engines rounds the truncated longitude for the point location of the merchant 102 from −106.838 to −106.

With continued reference to FIG. 4, the region engine 110 further accesses the data structure 112, which includes the stored partition keys for the accessed regions, and identifies, at 418, one or more of the regions as corresponding to the truncated and rounded point location of the merchant from the transaction record (e.g., when the truncated, rounded point location is sufficiently consistent with the partition key of the one or more regions, etc.). In various embodiments, the point location from the transaction record may be sufficiently consistent with the partition key when it is an exact match (e.g., −106 and −106, etc.), or when the point location is within a defined interval of the partition key (or vice-versa), etc. In the latter, the defined interval may be based on the width of one or more of the regions, for example, to ensure that, regardless of the point location in any of the regions (and regardless of the shape of the region), the partition key of the region would be identified as sufficiently consistent with the point location.

In this exemplary embodiment, the defined interval is based on an integer representation of the longitude, whereby a next incremental longitude in either direction provides the defined interval. For example, for a longitude of −105.55, the defined interval includes −104, −105 and −106 longitudes, where each longitudinal degree represents about 69 miles. It should be appreciated that the defined interval may be determined in this manner, when there are a suitable number of polygons that correspond to the region. In at least one other embodiment, other boundaries, such as, for example, boundaries of cities, may be employed as defined intervals.

Referring again to the example of FIG. 3 (and the determination of the point location of the merchant 102, in truncated form, as −106), the region engine 110 identifies Montana, Wyoming, New Mexico, and Colorado from the data structure 112 as corresponding to the point location of the merchant 102, because the point location of the merchant (i.e., −106) is sufficiently consistent with the partition keys of each of these states (as shown in Table 2) based on a defined interval of four degrees for this example (e.g., −106±4; etc.).

The region engine 110 then determines, at 420, whether the point location of the merchant from the transaction record is within one of the identified regions. In at least one exemplary embodiment, the region engine 110 determines the inclusion by relying on at least one SQL utility, which includes GIS functionalities to allow tables with a defined set of points (defined by latitude and longitude) and a polygon boundary to be joined on a condition that a point lies within the boundary of the polygon. And, when one of the regions is determined as including the point location of the merchant, the region engine 110 stores, at 422, the determined region in the data structure 112 as the region of the point location of the merchant involved in the transaction. It should be appreciated that when the latitude and longitude are both retained in the point location (i.e., not truncated), the above may be completed for the longitude or the latitude, and then repeated for the identified regions for the other of the longitude and the latitude. This may be useful when the number of regions is substantial (e.g., for cities, counties, etc., in the United States, etc.). Such an embodiment may include different defined interval(s), sufficient to ensure that the region of the point location is not excluded from the regions identified at 418.

It should be appreciated that the determination at step 420 may be performed by one or more node computing devices 116 of the region engine 110, whereby the primary node computing device 114 selects and/or identifies the node computing devices 116, based on the identified regions. For example, each of the node computing devices 116 may include certain boundary definitions for different regions, which is identified in a data structure stored in the primary node computing device 114 (e.g., in memory 204, etc.) (e.g., a look-up table of regions to node computing devices, etc.). When the regions are identified, the primary node computing device 114 then searches in the data structure for the identified regions and identifies and/or selects those node computing devices 116, which includes boundary definitions for the identified regions. The primary node computing device 114 may then provide the point location to the identified node computing devices 116, whereby the node computing devices 116 then determine whether the point location of the merchant from the transaction record is within one of the identified regions associated therewith.

With reference again to the example of FIG. 3, the region engine 110 (and an included node computing device 116) determines (at 420) whether the point location of the merchant 102 (from the given transaction record) is within, at most, one of the four different states identified at 418 (i.e., within one of Montana, Wyoming, New Mexico, or Colorado). In particular, the region engine 110 (and, more particularly, one or more of the identified node computing devices 116) compares the entire point location of the merchant 102 (39.191 latitude and −106.828 longitude) to the defined boundaries of each of the four identified states and determines that the point location of the merchant 102 is within the state of Colorado. Consequently, the region engine 110 assigns Colorado as a recognized region of the merchant 102 and/or the specific transaction record, and stores (at 422) "Colorado" or CO (i.e., the state code for Colorado) in the transaction record in the data structure 112 as the state of the point location of the merchant 102 involved in the given transaction.

It should be appreciated that, for each of the incomplete transaction records accessed by the region engine 110 at 412, the region engine 110 performs/repeats each of the operations 414 through 422 (e.g., simultaneously or consecutively).

It should also be appreciated that, while the system 100 and method 400 are presented above with respect to a "transaction record," the systems and methods described herein may be applicable to any kind of data records and/or data structures in which point locations are known, but regions containing the point locations are not. In addition, it should be further appreciated that the regions described herein may include any desired regions and are not necessarily limited to states, etc. In general, the regions will be commensurate with the omitted location data in the given record, so that it may be filled.

In view of the above, the systems and methods herein permit more efficient identification of regions in which point locations are included. In particular, in the example of FIG. 3 above, the point location of the merchant 102 was initially determined to be within one of four identified regions whereby only those four regions were then analyzed in detail, as compared to analyzing all forty-eight accessed/potential regions (i.e., the entire continental United States, etc.). The reduction in the number of regions in which the point location may be included significantly reduces the processing required to identify the actual region (e.g., particularly for postal code regions or administrative code boundaries, etc.) and/or may provide a manner of identifying the region when not previously permissible (e.g., where checking inclusion of the point location in each of hundreds or thousands or tens of thousands of regions is resource prohibitive (or when brute force fails), etc.). That is, while the benefits of the instant disclosure are exemplified (with reference to FIG. 3) with respect to an example that includes forty eight different polygons, the systems and methods herein may yield even more significant efficiencies when greater numbers of polygons (and available regions) exist, each potentially having greater numbers of points.

What's more, parallel searching for a point location in all available regions is generally not permitted or permissible through parallel processing on multiple computing devices, because a membership search (as described herein) generally requires all the data from polygons (e.g., regions, etc.) and points to be present at one computing device. The systems and methods herein, however, by initially identified certain region(s) (polygon(s)), in which the point location is present, enable a parallel processing of the determination, through use of node computing devices, where the boundary definitions of the regions are segregated into different node computing devices, and the node computing devices perform membership searches for the boundary definitions of identified regions included therein.

Moreover, the systems and methods herein, based on accuracy and speed, may be employed in a variety of different areas, including, for example, fraud detection, etc. For example, since the systems and methods herein partition various polygons or regions into different buckets (e.g., based on partition keys, etc.), it may be easier and faster to identify activities not in a certain vicinity (e.g., a card holder's residential region, etc.) to detect fraud.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by (a) accessing, by a computing device, multiple boundary definitions in a database associated with the computing device, each of the multiple boundary definitions associated with one of multiple regions; (b) for each of the accessed regions: (i) determining, by the computing device, a centroid of the region based on the one of the multiple boundary definitions associated with the region, the centroid having a latitude and a longitude; (ii) truncating, by the computing device, the centroid, whereby the truncated centroid includes one of the latitude and the longitude; and (iii) storing, by the computing device, the truncated centroid as a partition key for the region in the database of the computing device; (c) accessing, by the computing device, a transaction record for a transaction, the transaction record including a point location of a first party involved in the transaction, the point location having a latitude and a longitude; (d) truncating, by the computing device, the point location, whereby the truncated point location includes one of the latitude and the longitude; (e) identifying, by the computing device, at least one of the multiple regions, when the truncated point location is sufficiently consistent with the partition key of the at least one of the multiple regions; (f) determining, by the computing device, which one of the at least one of the multiple regions includes the point location of the first party; and (g) assigning the determined one of the at least one of the multiple regions as a recognized region of the first party and/or the transaction.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in tracking and/or identifying a region in which a point location is included, the method comprising:
   accessing, by a computing device, multiple boundary definitions in a database associated with the computing device, each of the multiple boundary definitions associated with one of multiple regions;
   for each of the regions associated with the accessed boundary definitions:
      determining, by the computing device, a centroid of the region based on the one of the multiple boundary definitions associated with the region, the centroid having a latitude and a longitude;
      truncating, by the computing device, the centroid, whereby the truncated centroid includes one of the latitude and the longitude; and
      storing, by the computing device, the truncated centroid as a partition key for the region in the database of the computing device;
   accessing, by the computing device, a data record, wherein the data record includes a point location of a first party associated with the data record, the point location having a latitude and a longitude;
   truncating, by the computing device, the point location, whereby the truncated point location includes one of the latitude and the longitude;
   identifying, by the computing device, at least one of the multiple regions, when the truncated point location is sufficiently consistent with the partition key of the at least one of the multiple regions;
   determining which one of the identified at least one of the multiple regions includes the point location of the first party; and
   assigning the determined one of the at least one of the multiple regions as a recognized region to the data record and/or the first party.

2. The method of claim 1, wherein each of the multiple regions includes one of a state, a city, or a county.

3. The method of claim 1, further comprising, for each of the regions associated with the accessed boundary definitions, rounding, by the computing device, the truncated centroid of the region to an integer, prior to storing the truncated centroid as the partition key for the region in the database associated with the computing device.

4. The method of claim 3, wherein truncating the centroid includes deleting the latitude of the centroid; and
   wherein truncating the point location includes deleting the latitude of the point location.

5. The method of claim 1, further comprising rounding the truncated point location of the first party; and
   wherein identifying at least one of the multiple regions includes identifying at least one of the multiple regions when the rounded truncated point location is sufficiently consistent with the partition key of the at least one of the multiple regions.

6. The method of claim 1, wherein determining which one of the identified at least one of the multiple regions includes the point location comprises determining, by at least one node computing device, that one of the at least one of the multiple regions includes the point location.

7. The method of claim 6, further comprising identifying, by the computing device, the at least one node computing device based on the multiple identified regions, wherein the at least one node computing device is different than the computing device.

8. The method of claim 1, wherein truncating the centroid includes deleting the longitude of the centroid; and
   wherein truncating the point location includes deleting the longitude of the point location.

9. A system for use in identifying a region in which a location is included, the system comprising:
   a database including at least one record and multiple boundary definitions, each of the multiple boundary definitions associated with one of multiple regions and including a centroid for said one of the multiple regions, the centroid including a latitude and a longitude; and at least one processor coupled to the database and configured, by executable instructions, to:
   access the at least one record in the database, the at least one record representative of a network transaction involving a first party, the at least one record including a point location for the first party and having a latitude and a longitude;
   identify at least one of the multiple regions in the database, when one of the latitude and the longitude of the point location is equal to or within a defined threshold of a corresponding one of the latitude and the longitude of the centroid for the at least one of the multiple regions;
   determine which one of the at least one of the multiple regions includes the point location of the first party; and
   assign the determined one of the at least one of the multiple regions as a recognized region of the at least one record and/or the first party.

10. The system of claim 9, wherein the at least one processor is further configured to:
   truncate the point location for the first party to one of the latitude and the longitude of the point location prior to identifying the at least one of the multiple regions, whereby the other of the latitude and the longitude of the point location is deleted from the centroid in the database.

11. The system of claim 9, wherein the at least one processor is further configured to:
   determine the centroid for one of the multiple regions based on the one of the multiple boundary definitions for the one of the multiple regions; and
   store the centroid in the database.

12. The system of claim 11, wherein the at least one processor is configured to determine the centroid for one of the multiple regions based on:

$$C_x = \frac{1}{6A}\sum_{i=0}^{n-1}(x_i + x_{i+1})(x_i y_{i+1} - x_{i+1} y_i); \text{ and}$$

-continued $$C_y = \frac{1}{6A}\sum_{i=0}^{n-1}(y_i + y_{i+1})(x_i y_{i+1} - x_{i+1} y_i).$$

13. The system of claim 9, wherein the the at least one processor is further configured to round the one of the latitude and the longitude of the centroid for the at least one of the multiple regions to an integer, prior to identifying the at least one of the multiple regions; and wherein the threshold includes ±1.0.

14. The system of claim 9, wherein the at least one processor is configured, in connection with identifying the at least one of the multiple regions in the database, to identify the at least one of the multiple regions in the database when the longitude of the point location is equal to or within a defined threshold of a corresponding one of the longitude of the centroid for the at least one of the multiple regions.

15. The system of claim 9, wherein the at least one processor is further configured to store the assigned one of the at least one of the multiple regions in the database as part of the at least one record.

16. The system of claim 15, wherein each of the multiple regions includes a state or a region defined by a postal code.

17. The system of claim 9, wherein the first party includes a merchant; and wherein the at least one record includes a payment account transaction record.

\* \* \* \* \*